(No Model.)

E. A. BENNER.
VALVE.

No. 555,202.  Patented Feb. 25, 1896.

WITNESSES:
W. E. Elbert
A. M. Wilson

INVENTOR
Elias A. Benner
BY
Henry C. Evert
ATTORNEY.

UNITED STATES PATENT OFFICE.

ELIAS A. BENNER, OF NOBLESTOWN, PENNSYLVANIA.

VALVE.

SPECIFICATION forming part of Letters Patent No. 555,202, dated February 25, 1896.

Application filed April 30, 1895. Serial No. 547,648. (No model.)

*To all whom it may concern:*

Be it known that I, ELIAS A. BENNER, a citizen of the United States of America, residing at Noblestown, in the county of Allegheny and State of Pennsylvania, have invented certain new and useful Improvements in Valves, of which the following is a specification, reference being had therein to the accompanying drawings.

This invention relates to certain new and useful improvements in valves, and is particularly designed and adapted to be employed in connection with steam-boilers.

The invention has for its object the provision of novel means whereby the leakage caused in valves of the above-referred-to class is effectually obviated; furthermore, to provide a valve with a double seat, so that in case one seat is worn the other seat will serve to close the valve, and vice versa, a further object of my invention being to design a valve that will be extremely simple in construction, strong, durable and comparatively inexpensive to manufacture.

With the above and other objects in view the invention finally consists in the novel construction, combination and arrangement of parts to be hereinafter more particularly described, and specifically pointed out in the claim.

In describing the invention in detail reference is had to the accompanying drawings, forming a part of this specification, and wherein like figures of reference indicate similar parts throughout the several views, in which—

Figure 1:
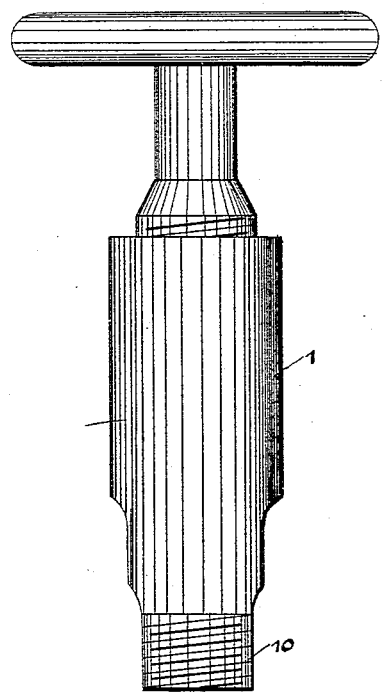
Figure 2:
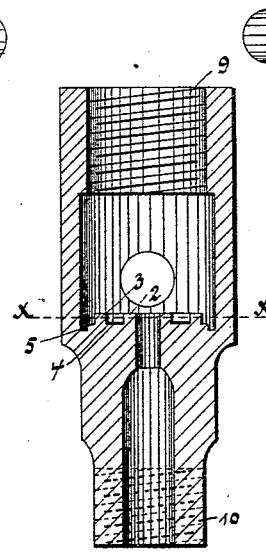
Figure 3:
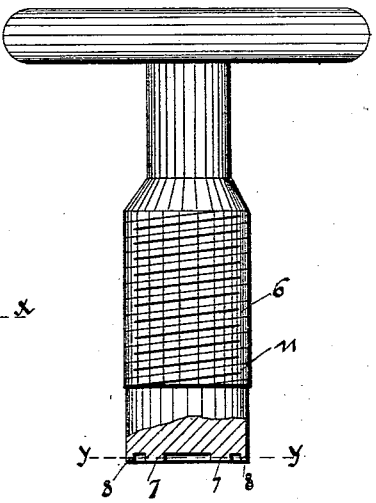
Figure 4:
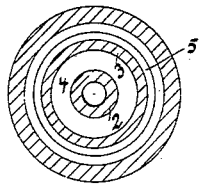
Figure 5:
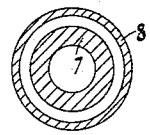

Figure 1 is a front elevation of the valve. Fig. 2 is a vertical sectional view of the valve. Fig. 3 is a detail view of the valve-stem, partly in section. Fig. 4 is a horizontal sectional view of the valve on the line X X of Fig. 2. Fig. 5 is a similar view on the line Y Y of the valve-stem of Fig. 3.

In the drawings, 1 indicates the valve proper, provided with an inner seat, 2, and an outer seat, 3, an annular recess 4 being formed between the inner and outer seat, a similar recess 5 being formed between the outer seat and the inner wall of the casing. The valve-stem 6 carries on its lower face an annular flange 7, adapted to fit in the recess 4 of the seat, and an outer annular flange 8, which will snugly fit in the outer recess 5 of the valve-seat. The casing of the valve is interiorly threaded at 9 and exteriorly threaded at 10, and applied in the well-known manner. The valve-stem is externally threaded at 11, and is adapted to engage the female screw-threads 9 of the valve, the entire construction of the valve being of the ordinary construction with the exception of the seat and valve-stem.

The advantages gained by this novel form of seat and valve-stem will be readily apparent, and the valve may be advantageously employed for all purposes.

It will be particularly noted that various changes may be made in the details of construction of the valve seat and stem without departing from the general spirit of my invention.

Having fully described my invention, what I claim as new, and desire to secure by Letters Patent, is—

A valve provided with an inner seat 2 and outer seat 3 with an intervening annular recess and a similar recess formed between the outer seat and the wall of the casing, a valve-stem, an outer annular flange carried thereby and adapted to enter the recess 5 of the valve-seat, an annular flange adapted to enter the recess 4 and means for securing the valve-seat in position, as and for the purpose described.

In testimony whereof I affix my signature in presence of two witnesses.

ELIAS A. BENNER.

Witnesses:
   H. C. EVERT,
   W. E. ELBERS.